United States Patent
Haran

(10) Patent No.: US 7,646,870 B2
(45) Date of Patent: Jan. 12, 2010

(54) TRIPLE CHURNING

(75) Inventor: Onn Haran, Even Yehuda (IL)

(73) Assignee: PMC-Sierra Israel Ltd., Herzliya Pituach (IL)

( * ) Notice: Subject to any disclaimer, the term of this patent is extended or adjusted under 35 U.S.C. 154(b) by 499 days.

(21) Appl. No.: 11/380,942

(22) Filed: May 1, 2006

(65) Prior Publication Data

US 2007/0140486 A1 Jun. 21, 2007

Related U.S. Application Data

(60) Provisional application No. 60/750,824, filed on Dec. 16, 2005.

(51) Int. Cl.
*H04L 9/18* (2006.01)
(52) U.S. Cl. .................. 380/256; 380/28; 380/255
(58) Field of Classification Search ............. 380/28–29, 380/255–256
See application file for complete search history.

(56) References Cited

U.S. PATENT DOCUMENTS

| 2003/0235298 A1* | 12/2003 | Hanounik | 380/29 |
| 2004/0071289 A1* | 4/2004 | Rose et al. | 380/37 |
| 2004/0136372 A1* | 7/2004 | Gruia | 370/390 |

OTHER PUBLICATIONS

Haran, Onn. "IEEE 802.3 EFM, Ethernet PON, Security Considerations". Mar. 13, 2001. Available at http://www.ieee802.org/3/efm/public/may01/haran_1_0501.pdf. Downloaded Dec. 24, 2008.*
Ralph Merkle, Martin Hellman. "On the Security of Multiple Encryption (PDF)", Communications of the ACM, vol. 24, No. 7, pp. 465-467, Jul. 1981.*
"*Gigibit-capable Passive Optical Networks (G-PON): General characteristics*" International Telecommunication Union G.984.1, Mar. 2003.
"*Gigibit-capable Passive Optical Networks (G-PON): Physical media Dependent (PMD) layer specification*" International Telecommunication Union G.984.2, Mar. 2003.
"*Gigibit-capable Passive Optical Networks (G-PON): Transmission convergence layer specification*" International Telecommunication Union G.984.3, Mar. 2003.
"*Broadband optical access systems based on Passive Optical Networks (PON)*" International Telecommunication Union G.983.1, Jan. 2005.

* cited by examiner

*Primary Examiner*—Nasser G Moazzami
*Assistant Examiner*—Travis Pogmore
(74) *Attorney, Agent, or Firm*—Mark M. Friedman

(57) ABSTRACT

A data encryption-decryption method includes the steps of receiving a data byte N and performing a triple-churning operation on byte N to obtain an encrypted byte N. Preferably, the triple-churning operation includes performing a first churning operation to obtain a first churned output, bit-wise XORing the first churned output with two values to obtain a first XOR result, performing a second churning operation on the first XOR result to obtain a second churned output, bit-wise XORing the second churned output with two values to obtain a second XOR result, and performing a third churning operation on the second XOR result to obtain encrypted byte N.

15 Claims, 6 Drawing Sheets

TRIPLE CHURNING

CROSS REFERENCE TO RELATED APPLICATIONS

The present invention claims priority from U.S. Provisional Patent Applications No. 60/750,824 filed 16 Dec. 2005, the content of which is incorporated herein by reference.

FIELD OF THE INVENTION

The present invention relates to data encryption-decryption methods, more particularly to improved churning methods, and most particularly to improved churning in passive optical networks (PON).

BACKGROUND OF THE INVENTION

Data encryption-decryption is necessary in a variety of communication technologies. Communication between any two entities is made more secure by encrypting the data. Specifically, communications through PONs may benefit from improved data encryption.

PONs having a plurality of optical network units (ONU) communicating with an optical line terminal (OLT) are well known in the art. An exemplary PON is shown schematically in FIG. 1. Specifically, the figure shows at Ethernet PON (EPON) 100 that has an OLT 102 communicating with three ONUs 106, 108 and 110 through a splitter 104. One of the key international standard specifications for a PON-based broadband optical access system is given by ITU-T Recommendation G.983.1. G.983.1 includes description of a data encryption function termed "churning" to offer a protection capability for data confidentiality purposes. This function is mandatory because, in a PON system, the OLT always physically broadcasts information downstream, but only one ONU at a time can decode the information. More specifically, in the system of FIG. 1, OLT 102 first sends a certain downstream message to request each ONU (e.g., ONU 104) to provide its churning key. In response to this request, the ONU 104 generates a churning key and sends it back to the OLT 102. With the received churning key, the OLT 102 encrypts, or churns, downstream cells before sending them out to ONU 104. This data churning operation for downstream cells are performed on an individual virtual path (VP) basis. OLT 102 notifies ONU 104 of which virtual path is churned or not, by sending a special downstream message indicating the virtual path identifier (VPI) of a particular path that is churned or not churned. This information is referred to as "churning parameters".

All ONUs in a PON system have their respective churning keys, and the churning of downstream information can be enabled or disabled separately for each VPI. The OLT sends downstream messages to notify each ONU of churning parameters before sending downstream cells. When data is received through a churned VP, the destination ONU decodes the data with its own churning key. Churning is a memoryless and history-less function. Every byte is churned without relation to any other byte. The transformations of some nibbles may be identified by using a very simple method based on the knowledge of known fields in packets.

Churning was suggested as a compromise for a non-encryption solution. As shown below, a major current disadvantage is that the decoding of churning is trivial Churning is easily broken using a very few packets and a breaking tool.

Since churning is different for upper and lower nibbles, two different tables are maintained by the breaking tool, but isolating data patterns is simpler because it is easier to identify patterns when looking at nibbles Following that, a simple differential cryptographic method is used by the breaking tool. Churning is a simple shift of a single bit in a nibble to a different bit location in a nibble with potential inversion. By locating the transformation of each bit, the entire transformation table is known.

The entire process is carried out by the breaking tool without caring about the key. The key itself is not important. The only important information is the nibble transformation. In the example below, we see two different transformations for two nibbles. Each output bit is affected only by a single input bit of the same nibble.

Consequently, it would be advantageous to have a churning method that will provide better encryption security than known churning methods.

SUMMARY OF THE INVENTION

According to the present invention there is provided, in a communication between two elements exchanging data, a data encryption-decryption method including the steps of receiving a data byte N and performing a triple-churning operation on byte N to obtain an encrypted byte N.

Preferably, the step of performing a triple-churning operation of byte N includes performing a first churning operation to obtain a first churned output, bit-wise XORing the first churned output with two values to obtain a first XOR result, performing a second churning operation on the first XOR result to obtain a second churned output, bit-wise XORing the second churned output with two values to obtain a second XOR result, and performing a third churning operation on the second XOR result to obtain encrypted byte N.

In some embodiments, each bit-wise XORing with two values includes bit-wise XORing with a data input and a previous data output.

In some embodiments, at least one of the values used in the XORing is 0.

In some embodiments, the bit-wise XORing of the first churned output with a data input and a data output includes XORing with an input of a previous byte N−1 and an output of a previous byte N−4.

In some embodiments, the bit-wise XORing of the second churned output with a data input and a data output includes XORing with an input of a previous byte N−1 and an output of a previous byte N−5.

In some embodiments, the performing a first churning operation to obtain a first churned output includes using an original 24-bit key, the performing a second churning operation on the first XOR result to obtain a second churned output includes using the original 24-bit key shifted by one byte, placing the least significant byte first followed by the two most significant bytes, and the performing a third churning operation on the second XOR result includes using the original 24-bit key shifted by two bytes, placing the two least significant byte first followed by the most significant byte.

In some embodiments, the method includes a further step of performing a triple de-churning operation on encrypted byte N to obtain back original byte N.

According to the present invention there is provided a data encryption system comprising a first churning engine for performing a first churning operation on a data byte N and for outputting a first churned output, a first XOR element for bit-wise XORing the first churned output with two values to obtain a first XOR result, a second churning engine for performing a second churning operation on the first XOR result to obtain a second churned output, a second XOR element fir bit-wise XORing the second churned output with two values to obtain a second XOR result and a third churning engine for performing a third churning operation on the second XOR result to obtain an encrypted data byte N.

In some embodiments, the system is configured to reverse the order of operations therefore de-churning the encrypted byte N to obtain back the original byte N.

According to the present invention there is provided, in a communication between two elements exchanging data, a data encryption-decryption method including the steps of receiving a data byte N and performing a churning operation on byte N using three, first, second and third churning engines, each churning engine using a different key, thereby obtaining an encrypted byte N.

Preferably, in the method, the step of performing a churning operation on byte N includes using a different key in each churning engine includes using a key of the second and third churning engines which is a variation of the key of the first churning engine without need to extend the key length for providing more information.

BRIEF DESCRIPTION OF THE DRAWINGS

For a better understanding of the present invention and to show more clearly how it could be applied, reference will now be made, by way of example only, to the accompanying drawings in which.

DETAILED DESCRIPTION OF THE INVENTION

The present invention discloses an improved churning method, referred to herein as "triple-churning". The method can be used for improving data security in communications between any two elements that exchange data. While described in detail with reference to PONs, it should be understood that the triple churning method disclosed herein is equally applicable to other communication networks.

Figure 1:
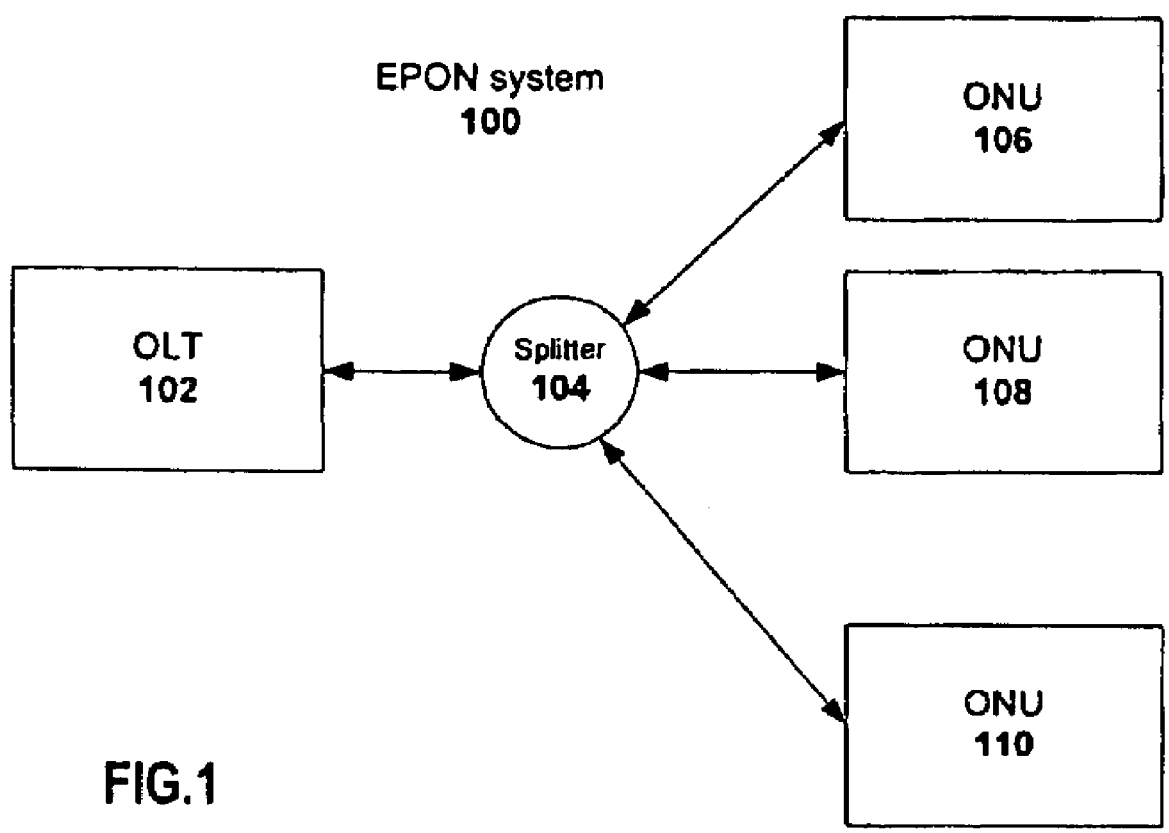
FIG. 1 shows an exemplary passive optical network.
Figure 2:
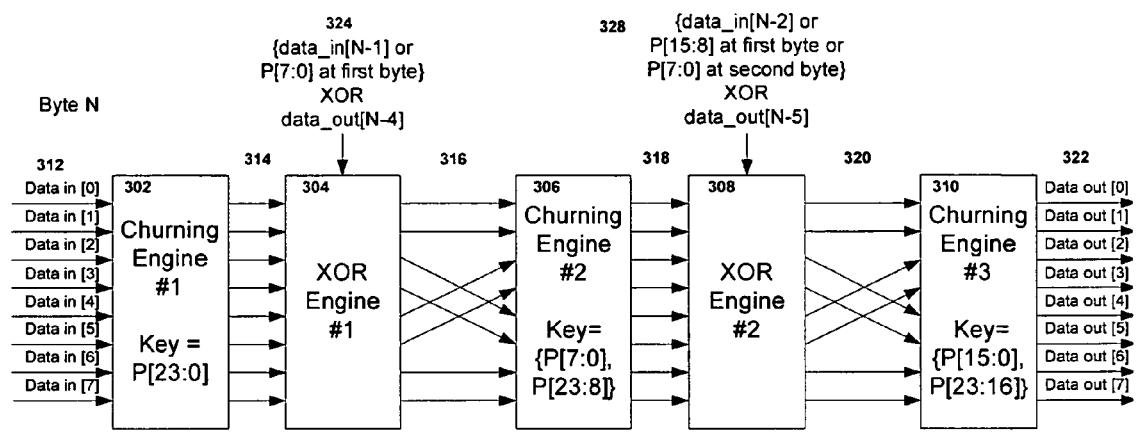
FIG. 2 shows a triple-churning scheme according to the present invention.

FIG. 2 shows a preferred embodiment triple-churning scheme based on cascading three churning engines. A first churning engine 302 uses the original 24-bit key P[23:0] used by all churning engines. A second churning engine 306 uses the same key shifted by one byte {P[7:0, P[23:8]}, placing the least significant byte first, followed by the two most significant bytes. A third churning engine 310 uses the same key shifted by two bytes {P[15:0, P[23:16]}, placing the two least significant byte first, followed by the most significant byte.

In use, byte N of data 312 is input into and churned in the first churning engine into an output 314. Output 314 is bit-wise XORed with two inputs (values) in a first XOR engine 304. The two inputs are an input 312 of the previous byte {data_in[N−1] or P[7:0] of first byte} and a previous data output 324 of 4 bytes ago, data_out[N−4]. The first value is used to add the influence of this byte into a final data output 322. In the value is the first byte of the packet, the least significant byte of the key is used. The second input to the XOR element (324) is used to whiten the input data (making sure the data looks random if the input data is totally static) and to make sure that repeated patterns will not be detected. This is somewhat similar to Cipher Block Chaining (CBC) mode, however, CBC uses just the input data (312), while here the output data (324) is also used. In the case of the first 4 bytes of the packets, the value 0 is used instead.

A result 316 of the first XOR operation is passed to second churning engine 306 after a bit shift in a transition (bit swap), and churned into an output 318). Bits 0, 1, 6, and 7 pass "as is". Bits 2 and 5 are swapped, and so are bits 3 and 4.

Output 318 is also bit-wise XORed with two inputs in a second XOR engine 308. The first value is a previous data input byte [N−2] 328. In the case of the first byte of the packet, the second byte of the key P[15:8] is used instead of data_in [N−2]. In the case of the second byte of the packet, the least significant byte of the key P[7:0] is used instead of data_in [N−2]. The second input to XOR engine 308 is a previous data output data_out[N−5] of 5 bytes ago. A result 320 of the second XOR operation is passed to third churning engine 310 after a bit swap as in the case of the first XOR operation. The output of the third churning engine is an "encrypted byte N". Overall, each output byte is influenced by 24 input bits.

In alternative embodiments, one or both inputs to either XOR engine may be 0, in which case the respective XOR function is inactive. Each XOR engine is therefore an "optional" element of the triple-churning system.

Figure 3:
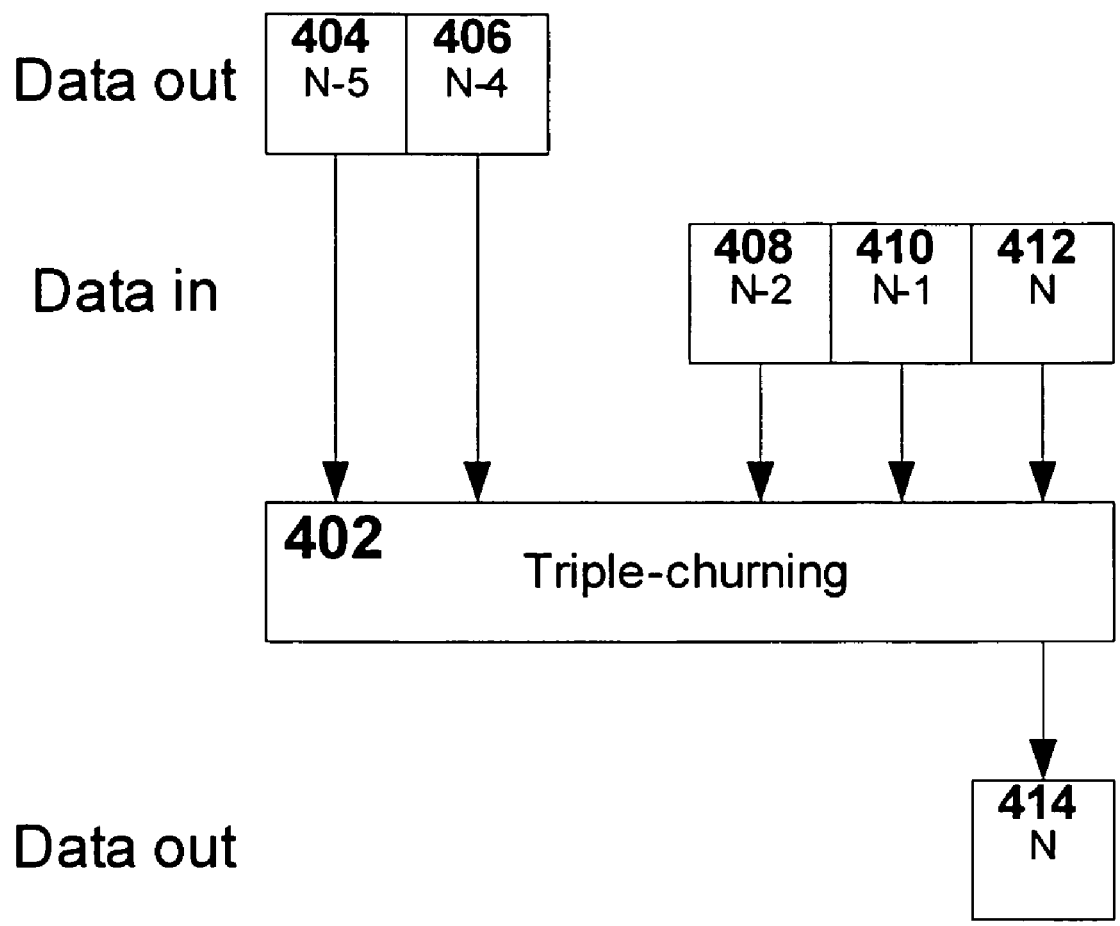
FIG. 3 shows schematically a data influence diagram.

FIG. 3 shows a data influence diagram that depicts, for a single output byte 414 which is the result of a single activation of the triple-churning engine, the last 3 input bytes 408, 410, 412 and previous output bytes 404, 406 that participate in the calculation of the current output byte. Output 414 corresponds to output 322, input 412 corresponds to input 312, 408 and 404 are used in 324 and 410 and 406 are used in 328 in FIG. 2

Figure 4:
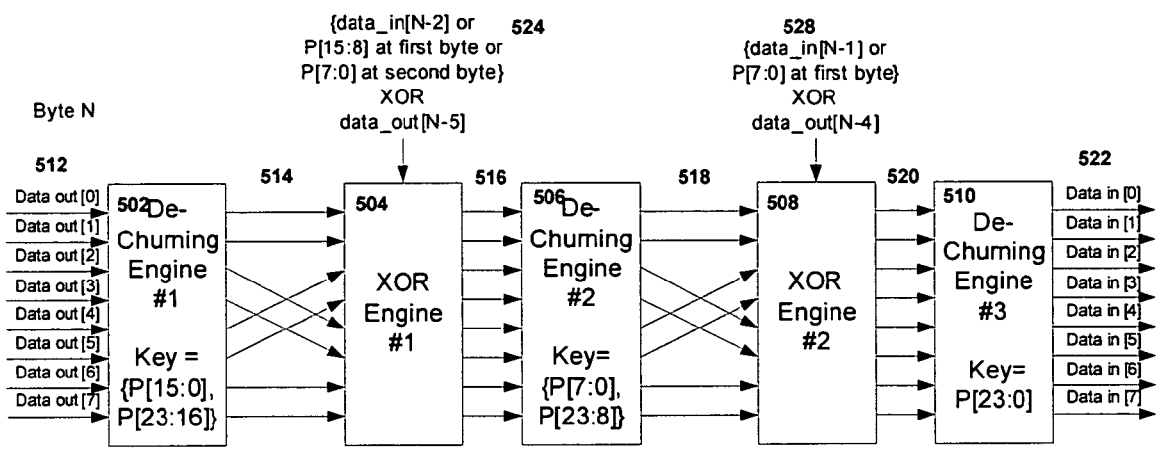
FIG. 4 shows a reverse triple-churning scheme according to the present invention.

The churning function is reversible. The reverse function is a simple mirror of the triple-churning. Opening the triple-churning requires reversing the older of operations. The reversal is illustrated in FIG. 4. Each churning engine is replaced with a de-churning engine. All the operations before the engines are simply performed in the reverse order they were previously performed.

Figure 5:
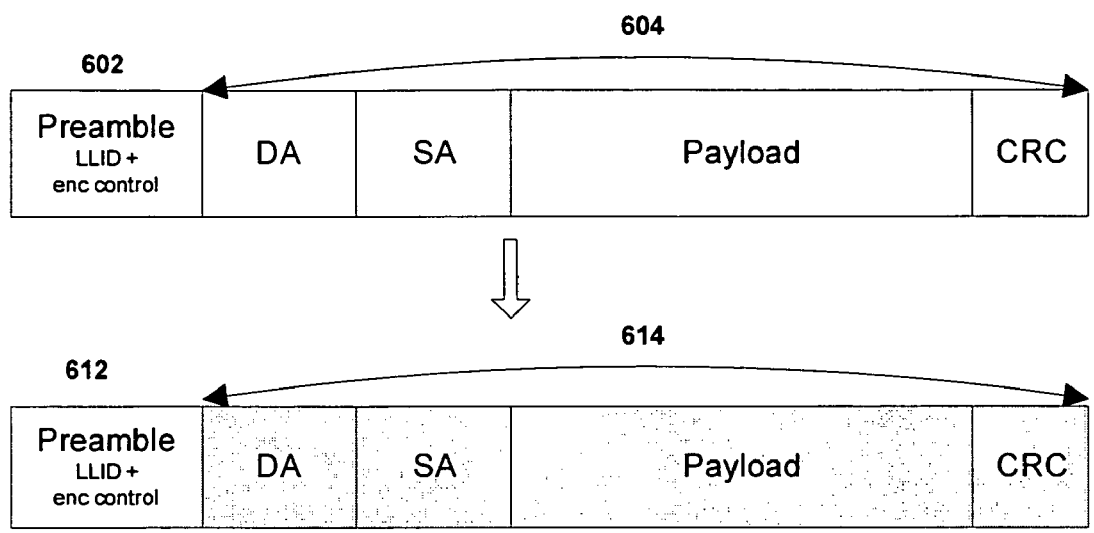
FIG. 5 shows a packet format for triple-churning.

The format of a packet entering the system of FIG. 2, is shown in FIG. 5. Each original packet includes an original packet preamble 602, and an original packet content from DA to CRC 604. Each encrypted packet includes a packet preamble 612 which is modified for adding encryption control and an encrypted packet content 614. The entire packet from DA till CRC is encrypted. The complete packet encryption provides the receiving side an indication that the packet was decrypted correctly. The preamble passes in the clear, i.e. information from the preamble can be used in the decryption process.

Figure 6:
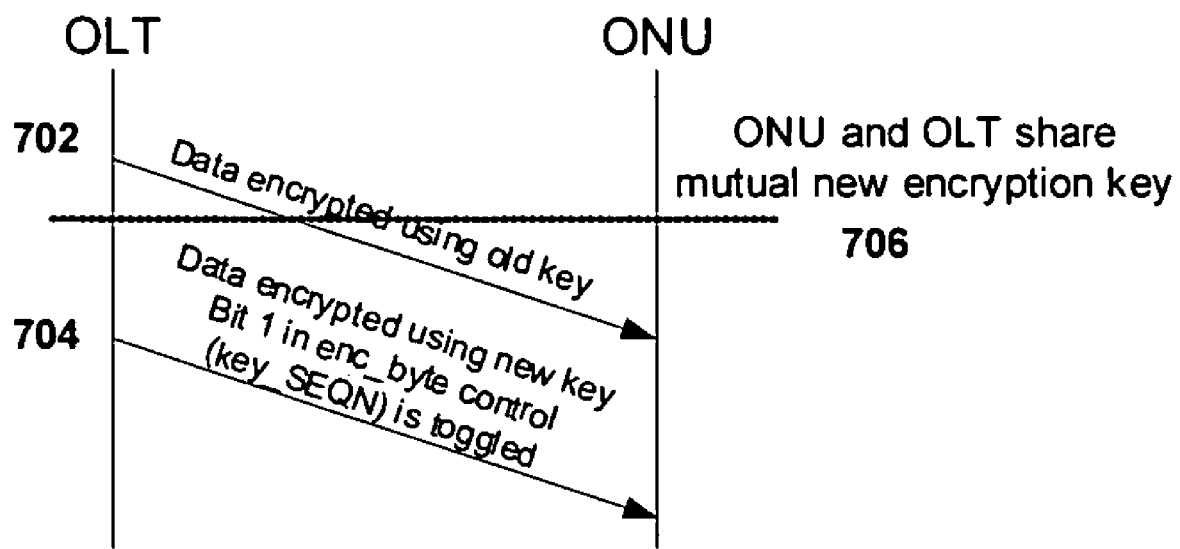
FIG. 6 shows a key exchange notification scheme as applied to triple-churning key exchange.

FIG. 6 shows an exemplary key exchange notification scheme. Other schemes may be equally useful. The 5th byte of the preamble, the one before the LLID, is used for key exchange and encryption control, as illustrated in 612. The least significant bit is set to 1 when the packet is encrypted and to 0 otherwise. The next to least significant bit marks the currently used key. This is required to perform key exchange. When the OLT decides to use a new key, it must toggle the current key number in the preamble, and use the new key. In FIG. 6, 702 indicates a packet encrypted by the current key. The key must be known to both the OLT and a respective ONU before the exchange, as occurs in step 706. The new key can be originated by either the ONU or the OLT, and passed through vendor specific OAM packet. Following that stage, the new key is used in step 704

While the invention has been described with respect to a limited number of embodiments, it will be appreciated that many variations, modifications and other applications of the invention may be made. Variations may include for example variations of a bit for the churning key, different byte indexes for the XOR values and different bit transformation. To cite a few specific ones:

1. Different indexes used in the XOR blocks in FIG. 2. For example, data_in[N−2] instead of data_in[N−1] can be used as element 324.
2. Different permutations for the keys. There are 32!=2E35 different options, and exemplarily one of these can be P[3:0], P[31:28]
3. Different key values can be XORed, for example, P[9:2] instead of P[7:0]
4. Different bit swap options after the XOR blocks. There are 8!=40320 different options, such as bit[7:0]={bit[0], bit[7:1]}|

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for enhancing the confidentiality of data transmitted between two, first and second communication network entities, comprising the steps of:
    a) at the first network entity, performing a triple-churning operation on a byte N to obtain an encrypted byte N, the triple-churning operation including:
        i. performing a first churning operation to obtain a first churned output;
        ii. bit-wise XORing the first churned output with two values to obtain a first XOR result;
        iii. bit-swapping the first XOR result;
        iv. performing a second churning operation on the first bit-swapped XOR result to obtain a second churned output;
        v. bit-wise XORing the second churned output with two values to obtain a second XOR result;
        vi. bit swapping the second XOR result; and
        vii. performing a third churning operation on the second bit-swapped XOR result to obtain encrypted byte N; and
    b) transmitting the encrypted byte N to the second network entity.

2. The method of claim 1, wherein each bit-wise XORing with two values includes bit-wise XORing with a data input and a previous data output.

3. The method of claim 1, wherein at least one of the two values in each bit-wise XORing with two values is 0.

4. The method of claim 1, wherein the bit-wise XORing of the first churned output with a data input and a data output includes XORing with an input of a previous byte N−1 and an output of a previous byte N−4.

5. The method of claim 1, wherein the bit-wise XORing of the second churned output with a data input and a data output includes XORing with an input of a previous byte N−1 and an output of a previous byte N−5.

6. The method of claim 1, wherein the performing a first churning operation to obtain a first churned output includes using an original 24-bit key, wherein the performing a second churning operation on the first XOR result to obtain a second churned output includes using the original 24-bit key shifted by one byte, placing the least significant byte first, followed by the two most significant bytes, and wherein the performing a third churning operation on the second XOR result includes using the original 24-bit key shifted by two bytes, placing the two least significant byte first followed by the most significant byte.

7. The method of claim 1, further comprising the step of:
    c) at the second network entity, performing a triple de-churning operation on encrypted byte N to obtain back original byte N.

8. The method of claim 1, wherein the communication network is a passive optical network, wherein the first network entity is an optical line terminal and wherein the second network entity is an optical network unit.

9. The method of claim 1, wherein the communication network is a passive optical network, wherein the first network entity is an optical network unit and wherein the second network entity is an optical line terminal.

10. An apparatus for enhancing the confidentiality of data transmitted between two, first and second communication network entities, comprising:
    a) a first churning engine for performing a first churning operation on a data byte N and for outputting a first churned output;
    b) a first XOR element for bit-wise XORing the first churned output with two values to obtain a first XOR result which is bit-swapped;
    c) a second churning engine for performing a second churning operation on the first bit-swapped XOR result to obtain a second churned output;
    d) a second XOR element for bit-wise XORing the second churned output with two values to obtain a second XOR result which is bit-swapped; and
    e) a third churning engine for performing a third churning operation on the second bit-swapped XOR result to obtain an encrypted data byte N which is transmitted from the first network entity to the second network entity;
    wherein the apparatus is included in each of the first and second network entities.

11. The apparatus of claim 10, wherein the communication network is a passive optical network, wherein the first network entity is an optical line terminal and wherein the second network entity is an optical network unit.

12. The apparatus of claim 10, wherein the communication network is a passive optical network, wherein the first network entity is an optical network unit and wherein the second network entity is an optical line terminal.

13. The apparatus of claim 10, wherein each key in each churning engine is a different key.

14. The system of claim 13, wherein each different key of the second and third churning engines is a variation of the key of the first churning engine, without need to extend the key length for providing more information.

15. The system of claim 13, wherein the key used by the first churning engine is an original 24-bit key P[23:0], wherein the key used by the second churning engine is an original 24-bit key shifted by one byte {P[7:0], P[23:8]} and wherein the key used by third churning engine is an original 24-bit key shifted by two bytes {P[15:0], P[23:16]}.

* * * * *